United States Patent Office 3,449,746
Patented June 10, 1969

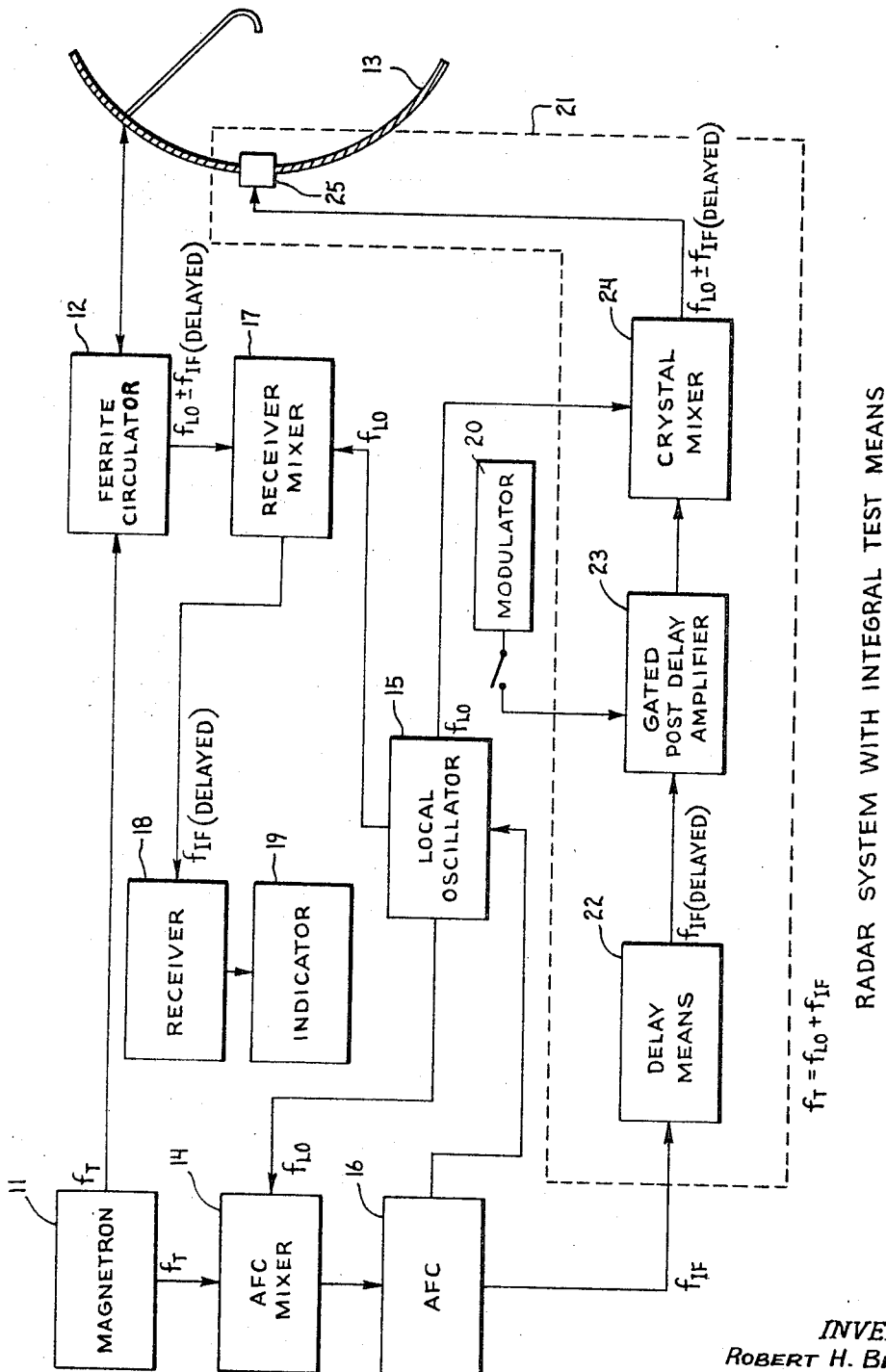

3,449,746
INTEGRAL RADAR TEST SYSTEM
Robert H. Begeman and Jack T. Kearschner, Indianapolis, Ind., assignor to the United States of America as represented by the Secretary of the Navy
Filed Nov. 6, 1967, Ser. No. 680,686
Int. Cl. G01s 7/40
U.S. Cl. 343—17.7        10 Claims

ABSTRACT OF THE DISCLOSURE

A radar performance checking means, to be constructed as an integral part of an airborne radar system, for enabling continual testing of the system during actual in-flight operation. The invention produces a synthetic target signal by sampling the intermediate frequency (IF) pulse in the automatic frequency control (AFC) unit of the radar system under test, delaying and gating this sampled pulse which is then heterodyned with a signal from the radar local oscillator (LO) in a crystal mixer to produce sum and difference frequencies, one of which corresponds to the radar transmitter frequency and is utilized as the synthetic target signal. This sum frequency signal is applied to the radar system antenna through a small feed-horn located at the center of the antenna reflector. This synethetic target signal is then "received" by the antenna and passed through its waveguide and receiver system, to provide a comprehensive test of both the transmitter and receiver sections of the radar system, which test may be performed, during actual in-flight operation of the system, at the end of a scan or other convenient time when a true return is not required.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention is in the field of testing and calibration means for radio wave communications equipment utilizing reflected or otherwise returned wave systems, and more specifically in the area of integral radar system testing means.

Most prior art testing means for checking and verifying the proper operation of radar systems have necessitated the use of rather large quantities of either laboratory or portable field test equipment, thereby making it impractical, if not impossible, to test an entire airborne radar system during actual in-flight operation, as such equipment would add intolerable weight and consume a prohibitively large amount of space in helicopters and fighter aircraft. In addition, most of these prior art testing means are incapable of providing a single overall radar system performance test. Instead, they independently test receiver sensitivity and transmitter power output, without providing any indication of the performance of the antenna feed assemblies. The integral test means of the present invention overcomes these disadvantages of the prior art and enables continual testing of an entire airborne radar system including the transmitter, receiver, and antenna assemblies during actual in-flight operation.

One prior art test means, disclosed in United States Patent 2,825,058 entitled "Target Simulator For Radar System Checking," which issued Feb. 25, 1958, to Earl H. Rix and Leon W. Rustad and is assigned to the same assignee as the present invention, does provide a testing means which is to be constructed as an integral part of the radar system to be tested. However, the integral testing means thereof utilizes a synchronizer, a pulser, and a separate oscillator in order to produce its simulated traget signal. The present invention produces its synthetic target signal with a minimum number of separate circuit components in the test system and without the need for, or use of, a synchronizer, pulser, or separate oscillator, thereby providing an integral test system of minimum size, complexity, and cost, and having increased reliability.

SUMMARY OF THE INVENTION

The present invention is a radar performance checking test means to enable continual performance testing of an airborne radar system during actual in-flight operation. It is intended to be constructed as an integral part of the radar system for producing a transmitter-dependent synthetic target signal which is "received" by the system antenna and passed through the antenna assembly and waveguide structures to the receiver and indicator sections where it is displayed on the indicator, thereby providing a comprehensive performance test of the entire radar system including the transmitter, antenna, waveguide, and receiver assemblies. Continual performance checking of navigational radars, such as automatic terrain following (ATF) systems, are essential for flight safety, and such testing is a desirable convenience for most other types of airborne radar systems.

The invention produces a synthetic target signal, which is dependent upon proper functioning of the radar system transmitter, by sampling the IF pulse in the AFC unit therein. This sampled IF pulse is then delayed an appropriate period of time by a delay line or other suitable delay means and passed to a gated post-delay amplifier circuit, where it is amplified to compensate for any attenuation caused by its passage through the delay means. This amplified may be manually "gated on" by the radar operator at any time when a synthetic target test signal is desired and a true return is not required, or it may be automatically "gated on" and "off" at suitable predetermined times such as the beginning or end of a scan, or it may be allowed to be "on" constantly to provide a combination range marker and synethetic target signal (the "range" being determined by the amount of delay introduced by the delay means). The manner of gating will be determined by the specific application, and is not considered to be a part of this invention. This amplifier may also be adapted to be phase and/or amplitude modulated in order to produce appropriate target signals for pulsed Doppler, continuous wave and other types of radar systems, as will be understood by those skilled in the art. The sampled IF pulse is passed from the gated amplifier to a crystal mixer, which also receives a signal from the radar system local oscillator and produces sum and difference frequencies of these two inputs. One of these frequencies (the sum) corresponds to the radar transmitter frequency from the magnetron and is applied to the radar system antenna through a small feedhorn located at the center of the antenna reflector. This synthetic target signal is "received" by the antenna pick-up means and coupled, via the radar system waveguide assemblies and T-R ferrite circulator, to the receiver mixer, which also receives an input signal from the system local oscillator to produce an output signal at the receiver IF frequency. This output signal at the receiver IF frequency is then coupled to the radar system receiver which causes it to be displayed on the system indicator in the same manner as the usual radar returns and at a "range" determined by the length of delay previously introduced by the delay means, thereby providing the comprehensive performance test of the entire radar system while utilizing only a delay means, gated amplifier, mixer, and small feedhorn, in conjunction with the radar system itself.

Thus, it is a general object of the present invention to provide an integral radar test means, having a minimum number of circuit components, for producing a synthetic target signal to enable continual comprehensive performance testing of an entire airborne radar system during actual in-flight operation of the system.

BRIEF DESCRIPTION OF THE DRAWING

This general object, as well as other objects, and the attendant advantages, features, and uses will become more apparent to those skilled in the art as the description proceeds when taken in consideration of the accompanying drawing, in which there is shown a block diagram of a typical radar system to which the integral test means of the present invention (shown within the broken lines) has been added.

DESCRIPTION OF THE PREFERRED EMBODIMENT

Referring more particularly to the figure of drawing, there is shown a block diagram of a typical active radar system wherein a transmitter magnetron circuit 11 produces a pulse of relatively high frequency $f_T$ which is coupled, via a transmit-receive (T–R) means 12 such as a ferrite circulator, to an antenna 13 for transmission to the target. Magnetron 11 is also coupled to an automatic frequency control mixer circuit 14, which receives a second input signal from the radar local oscillator 15. The AFC mixer 14 provides an output to the automatic frequency control (AFC) circuit 16 which, in turn, produces a signal for the control of local oscillator 15. The signal produced by magnetron 11 and transmitted to the target by antenna 13 is reflected by the target and received by antenna 13. If then passes via the waveguide assemblies and T–R device 12 (ferrite circulator) to the receiver mixer 17. An input signal from local oscillator 15 is also provided to receiver mixer 17 which combines these two inputs to reproduce the desired IF frequency, ($f_{IF\ DELAYED}$), which is coupled from mixer 17 to receiver 18. Receiver 18 causes the signal to be displayed by the indicator means 19. Thus it will be recognized by those skilled in the art that components 11 through 19 comprise one form of a conventional active radar system, typical of those of the prior art. Component 20 represents a suitable modulator capable of providing either amplitude modulation, or pulse modulation, or both, when desired for a particular application, for switchably coupling to an amplifier 23 of the invention. The remaining components, within dotted block 21 of the figure of drawing, comprise the integral test means of the present invention.

The integral test means of this invention is comprised of a delay means 22 which has input means coupled to automatic frequency control circuit 16 of the radar system for sampling the radar system intermediate frequency ($f_{IF}$) pulse therein. Delay means 22 merely delays the sampled IF pulse from AFC circuit 16 for an appropriate period (determined by the "range" or position on indicator 19 at which it is desired for the synthetic target to be displayed), and may be either an adjustable delay means or a fixed delay line depending upon the specific application to be made of the test signal. The delayed IF signal ($f_{IF\ DELAYED}$) is coupled from delay means 22 to a gated post delay amplifier 23 which amplifies the signal to compensate for attenuation by the delay means 22. At this point, amplifier 23 may also be adapted to receive suitable phase and/or amplitude modulation from modulator 20 into the delayed and amplified IF signal in order to develop a target signal suitable for use in a pulsed Doppler, continuous wave (CW), or other form of radar system, as will be understood by those skilled in the art. Amplifier 23 couples the amplified IF signal ($f_{IF\ DELAYED}$) to a crystal mixer 24 which also receives an input signal ($f_{LO}$) from the radar local oscillator 15. Mixer 24 produces sum and difference frequencies ($f_{LO} \pm f_{IF\ DELAYED}$), of these two input signals, one of which (the sum frequency) corresponds to the radar transmitter frequency $f_T$ produced by magnetron 11. The output of mixer 24 is utilized as the synthetic target signal and is coupled to a small feedhorn 25 located at the center of the reflector of antenna 13. Feedhorn 25 radiates this delayed synthetic target signal which is then "received" by the pickup means of antenna 13 in the same manner as if it were a true target-reflected signal. The "received" signal is then coupled through the radar system waveguide assemblies and T–R device 12 to receiver mixer 17. Mixer 17 receives a second input signal from local oscillator 15 and produces, from these two input signals, an output signal at the IF frequency of the system receiver 18. This output signal of mixer 17 is coupled to receiver 18 which causes it to be displayed on the system indicator 19 in the same manner as a true target return and at a range position determined by, and directly proportional to, the length of delay introduced into the synthetic target signal by delay means 22.

This display of the transmitter-dependent synthetic target signal on the system indicator 19 provides a comprehensive performance test of the entire active radar system, which may be carried out intermittently or on a regular continuing basis at any desired time during normal operation of the system. This comprehensive performance test is made possible by the integral test means of the present invention, which is comprised of a combination of four well known and readily available circuit components: a delay means 22, an amplifier 23, a mixer 24, and a small feedhorn 25. Since delay means 22 determines the relative "range" position at which the synthetic target will be displayed on the system indicator 19, the choice of a specific type of delay means will be governed by the requirements of a particular application or system. If it is necessary that the synthetic target be made to appear at various range positions on indicator 19, then an adjustable delay means should be selected. However, if it is satisfactory for the synthetic target to appear at a fixed range position on indicator 19, a fixed delay quartz delay line may be selected. With regard to post delay amplifier 23, any amplifier suitable for amplifying radar IF frequencies and having means for being gated on and off may be used; and if it should be desirable or permissible for the synthetic target signal to be constantly present on the indicator screen, thereby providing a combination range marker and synthetic target signal, no gating means will be necessary for amplifier 23. Otherwise, amplifier 23 may be activated, or manually "gated on", by the radar operator for any period that a target test signal is desired, or it may be automatically gated on and off at suitable predetermined times, such as the beginning or end of a scan. The specific manner of gating and/or modulating amplifier 23 where desired is not considered to be a part of this invention. Mixer 24 may be any mixer suitable for producing sum and difference frequencies from the IF and LO input frequencies, and feedhorn 25 would be constructed as an integral part of the radar antenna 13.

Thus it has been shown in view of the foregoing explanation and figure of drawing, that the present invention, an integral radar test system, is a useful and practical device in the field of active radar performance checking means.

While many modifications and changes may be made by utilizing various forms of delay means, gated amplifiers with or without provision for phase and/or amplitude modulation, mixers, and feedhorns, it is to be understood that we desire to be limited in the spirit of our invention only by the scope of the appended claims.

We claim:

1. An integral radar testing means for producing a synthetic target signal to enable performance testing of an entire operating radar system, said radar system having at least an automatic frequency control means, a local oscillator means, and an antenna, said testing means comprising:
  delay means having input means for coupling to said automatic frequency control means for receiving signal pulses therefrom at the intermediate frequency of said radar system, and having output means for providing delayed said signal pulses thereat;
  amplifier means having input means coupled to said output means of said delay means for receiving therefrom said delayed signal pulses, and having output means for providing thereat amplified said delayed signal pulses;
  mixer means having first input means coupled to said output means of said amplifier means for receiving therefrom said amplified delayed signal pulses, having second input means coupled to said local oscillator means of said radar system for receiving therefrom a continuous signal at the local oscillator frequency, and having output means for providing thereat sum frequency synthetic target signals from the signals received at said first and second input means of said mixer means; and
  signal radiating means coupled to said output means of said mixer means for receiving said sum frequency synthetic target signals therefrom and radiating said target signals into said antenna for reception by said operating radar system.

2. An integral radar testing means for producing a synthetic target signal to enable performance testing of an entire operating radar system, said radar system having at least an automatic frequency control means, a local oscillator means, and an antenna, as set forth in claim 1 wherein:
  said delay means comprises adjustable delay means for varying the amount of delay introduced thereby.

3. An integral radar testing means for producing a synthetic target signal to enable performance testing of an entire operating radar system, said radar system having at least an automatic frequency control means, a local oscillator means, and an antenna, as set forth in claim 1 wherein:
  said delay means comprises a fixed delay means, such as a quartz delay line.

4. An integral radar testing means for producing a synthetic target signal to enable performance testing of an entire operating radar system, said radar system having at least an automatic frequency control means, a local oscillator means, and an antenna, as set forth in claim 1 wherein:
  said amplifier means includes gating means for controlling the passage of said amplified delayed signal pulses therefrom.

5. An integral radar testing means for producing a synthetic target signal to enable performance testing of an entire operating radar system, said radar system having at least an automatic frequency control means, a local oscillator means, and an antenna, as set forth in claim 2 wherein:
  said amplifier means includes gating means for controlling the passage of said amplified delayed signal pulses therefrom.

6. An integral radar testing means for producing a synthetic target signal to enable performance testing of an entire operating radar system, said radar system having at least an automatic frequency control means, a local oscillator means, and an antenna, as set forth in claim 3 wherein:
  said amplifier means includes gating means for controlling the passage of said amplified delayed signal pulses therefrom.

7. An integral radar testing means for producing a synthetic target signal to enable performance testing of an entire operating radar system, said radar system having at least an automatic frequency control means, a local oscillator means, and an antenna, as set forth in claim 1 wherein:
  said amplifier means includes means for receiving phase modulating signals to cause said amplified delayed signal pulses to become phase modulated.

8. An integral radar testing means for producing a synthetic target signal to enable performance testing of an entire operating radar system, said radar system having at least an automatic frequency control means, a local oscillator means, and an antenna, as set forth in claim 1 wherein:
  said amplifier means includes means for receiving amplitude modulating signals to cause said amplified delayed signal pulses to become amplitude modulated.

9. An integral radar testing means for producing a synthetic target signal to enable performance testing of an entire operating radar system, said radar system having at least an automatic frequency control means, a local oscillator means, and an antenna, as set forth in claim 1 wherein:
  said amplifier means includes means for receiving phase and amplitude modulating signals to cause said amplified delayed signal pulses to become phase and amplitude modulated.

10. An integral radar testing means for producing a synthetic target signal to enable performance testing of an entire operating radar system, said radar system having at least an automatic frequency control means, a local oscillator means, and an antenna, as set forth in claim 1 wherein:
  said signal radiating means comprises a small feedhorn located at the center of said antenna of said radar system.

References Cited

UNITED STATES PATENTS

| 2,825,058 | 2/1958 | Rix et al. | 343—17.7 |
| 3,354,457 | 11/1967 | Pfab et al. | 343—17.7 |

RODNEY D. BENNETT, JR., *Primary Examiner.*

T. H. TUBBESING, *Assistant Examiner.*